US007016352B1

(12) United States Patent  
Chow et al.

(10) Patent No.: US 7,016,352 B1  
(45) Date of Patent: Mar. 21, 2006

(54) ADDRESS MODIFICATION WITHIN A SWITCHING DEVICE IN A PACKET-SWITCHED NETWORK

(75) Inventors: Peter Ka-Fai Chow, San Jose, CA (US); Somnath Viswanath, San Jose, CA (US); Shr-Jie Tzeng, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 868 days.

(21) Appl. No.: 09/814,811

(22) Filed: Mar. 23, 2001

(51) Int. Cl.
*H04L 12/28* (2006.01)
*H04L 12/56* (2006.01)

(52) U.S. Cl. ............... 370/392; 370/389; 370/412; 370/413; 370/415; 370/417; 370/428; 370/429; 709/238

(58) Field of Classification Search ........... 370/392, 370/389, 412–419, 463, 396, 398, 400, 395.7, 370/395.71, 395.72, 356, 390, 397, 393, 370/429, 428, 458, 469; 709/230, 240, 208–216, 709/220, 236, 238
See application file for complete search history.

(56) References Cited

U.S. PATENT DOCUMENTS

| 6,542,512 | B1 * | 4/2003 | Fischer et al. ............... 370/412 |
| 6,625,157 | B1 * | 9/2003 | Niu et al. ............... 370/395.71 |
| 6,804,234 | B1 * | 10/2004 | Chow ........................ 370/389 |
| 6,901,050 | B1 * | 5/2005 | Acharya .................. 370/230.1 |
| 6,925,055 | B1 * | 8/2005 | Erimli et al. ............... 370/229 |
| 6,944,174 | B1 * | 9/2005 | Chow ........................ 370/413 |
| 2002/0087723 | A1 * | 7/2002 | Williams et al. .......... 709/240 |
| 2003/0072316 | A1 * | 4/2003 | Niu et al. .................. 370/412 |

* cited by examiner

*Primary Examiner*—Wellington Chin
*Assistant Examiner*—Jamal A. Fox
(74) *Attorney, Agent, or Firm*—Harrity Snyder LLP

(57) ABSTRACT

A multiport switching device includes an Internal Rules Checker (IRC) that determines forwarding addresses for packets received at the device. The determined forwarding addresses may include a new MAC destination address that is to substituted for the MAC destination address of the received packet. In one implementation, the new MAC destination address is transmitted from the IRC to the dequeuing logic by transmitting pairs of adjacent words through the switch output queues. In other implementations, the new MAC destination address is transmitted from the IRC to the dequeuing logic by transmitting an index field to the output queuing logic or by having the IRC write the new MAC destination address directly to memory.

17 Claims, 6 Drawing Sheets

ADDRESS MODIFICATION WITHIN A SWITCHING DEVICE IN A PACKET-SWITCHED NETWORK

BACKGROUND OF THE INVENTION

1. Technical Field

The present invention relates generally to switching in a packet switched network and, more specifically, to systems and methods for translating network addresses within a network device.

2. Background Art

At the heart of most networks are switches interconnected via a communications medium. For example, Ethernet is a commonly used local area network scheme in which multiple stations are connected to a single shared serial data path. These stations communicate with a switch located between the shared data path and the stations connected to that path. The switch controls the communication of data packets on the network.

Networks are frequently organized into sub-networks, called subnets. Within a single subnet, packets of information may be directed to their destination devices using a layer 2 Media Access Control (MAC) address that identifies the attached Ethernet devices. When a switch receives a packet with a familiar destination MAC address, it forwards the packet to the output port associated with the MAC address.

Packets being transmitted between layer 2 subnets travel through the network using the destination device's IP (Internet Protocol) layer 3 address. More particularly, a transmitting device sending a packet to a destination device outside of the transmitting device's subnet first determines, using the IP layer 3 address, the layer 2 MAC address of a gateway router that bridges the subnets. The gateway router, upon receiving the packet, performs address translation, which involves stripping the MAC destination address of the router and inserting a new MAC destination address that corresponds to the MAC address of the destination device in the destination subnet. The router determines the MAC address to substitute based on the IP address.

Generating and substituting the new MAC destination address for the old MAC address incurs additional overhead for the gateway router that is not experienced by the layer 2 switches. Accordingly, the gateway router may require more time to transmit its received packets than the layer 2 switches. This can be problematic for certain applications, such as multimedia applications, that stream large numbers of packets across subnets. Ideally, it is desirable to reduce routing latency to match switching latency so that delay-sensative traffic can stream across subnets without disruption.

Thus, there is a need in the art to improve layer 3 routers to reduce latency during MAC address translation.

SUMMARY OF THE INVENTION

Objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the present invention, a multiport network device comprises a receiver and a transmitter. Internal rules checking logic is coupled to an output of the receiver. The internal rules checking logic receives header information relating to data frames received by the receiver and, based on the header information, generates a forwarding descriptor that identifies transmit ports from which to transmit the data frames. Additionally, the internal rules checking logic generates an intended destination address for the data frames. A queue receives the forwarding descriptors and the intended destination address as pairs of sequential words in the queue.

A second aspect of the present invention is directed to a multiport network device that also comprises a receiver and a transmitter. In this aspect of the present invention, the internal rules checking logic generates a forwarding descriptor that identifies the transmit ports, an intended destination address, and an index value corresponding to the new intended destination address. A queue receives the forwarding descriptors and the index value corresponding to the intended destination address and transmits each of the forwarding descriptors and the index value to the transmitter. The index value is used by the transmitter to obtain the intended destination address for the data frames by querying the internal rules checking logic with the index value.

Additional aspects of the present invention are directed to the multiport network device and a method associated with the multiport network device.

BRIEF DESCRIPTION OF THE DRAWINGS

The accompanying drawings, which are incorporated in and constitute a part of this specification, illustrate an embodiment of the invention and, together with the description, explain the invention. In the drawings.

BEST MODE FOR CARRYING OUT THE INVENTION

Figure 1:
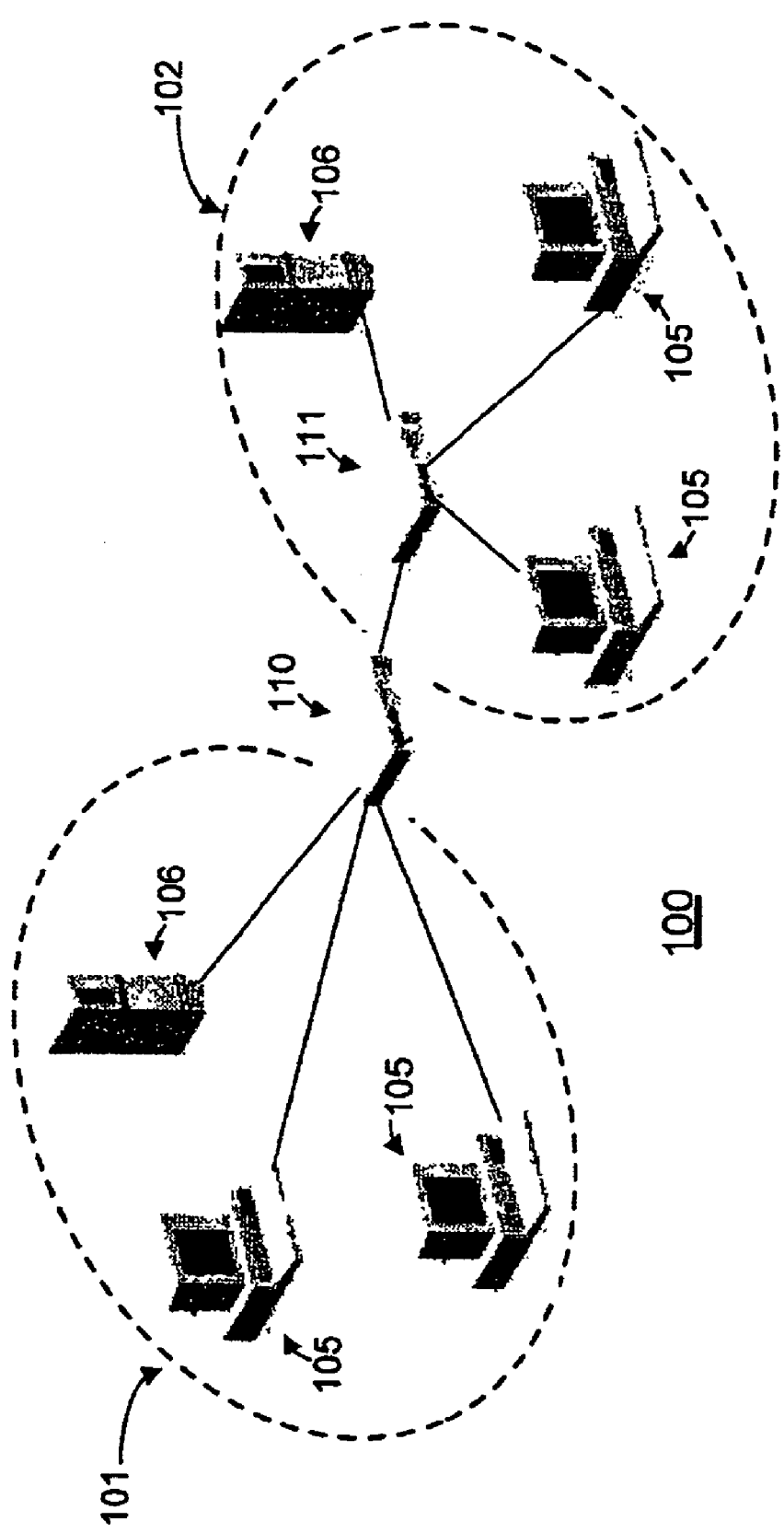
FIG. 1 is a high-level diagram of an exemplary network for implementing a multiport switch.

The following detailed description of the invention refers to the accompanying drawings. Like objects in the drawings may be referred to using the same reference numeral in different drawings. The detailed description does not limit the invention. Instead, the scope of the invention is defined by the appended claims and equivalents.

As described herein, a switch performs layer 3 routing functions, including substituting MAC destination addresses based on a packet's IP address. The MAC address substitution is efficiently handled within the switch using a minimum of additional circuitry relative to previous generations of layer 2 switches.

Switch Architecture Overview

The present invention will be described with the example of a layer 3 switch or router in a packet switched network, such as an Ethernet (IEEE 802.3) network. It will become apparent, however, that the present invention is also applicable to other types of packet switched systems, as described in detail below, as well as to other types of systems in general.

FIG. 1 is a high-level diagram of an exemplary packet-switched network. The packet-switched network 100 may be an Ethernet (IEEE 802.3) based network. Network 100 includes multiple subnets 101 and 102. Each subnet may include a number of different devices, such as client computers 105 and/or server computers 106. A layer 3 switch 110 routes traffic through network 100, and in particular, switch 110 can route traffic between subnets 101 and 102. A layer 2 switch 111 routes traffic within subnet 102.

Packets traveling within a subnet are directed based on the layer 2 MAC address of the devices within the subnet. A packet traveling between subnets 101 and 102, however, is first given the MAC address of the layer 3 switch 110. At switch 110, the MAC address of the destination device is substituted for the original MAC address, and then forwarded, using the new MAC address, to its final destination device.

Figure 2:
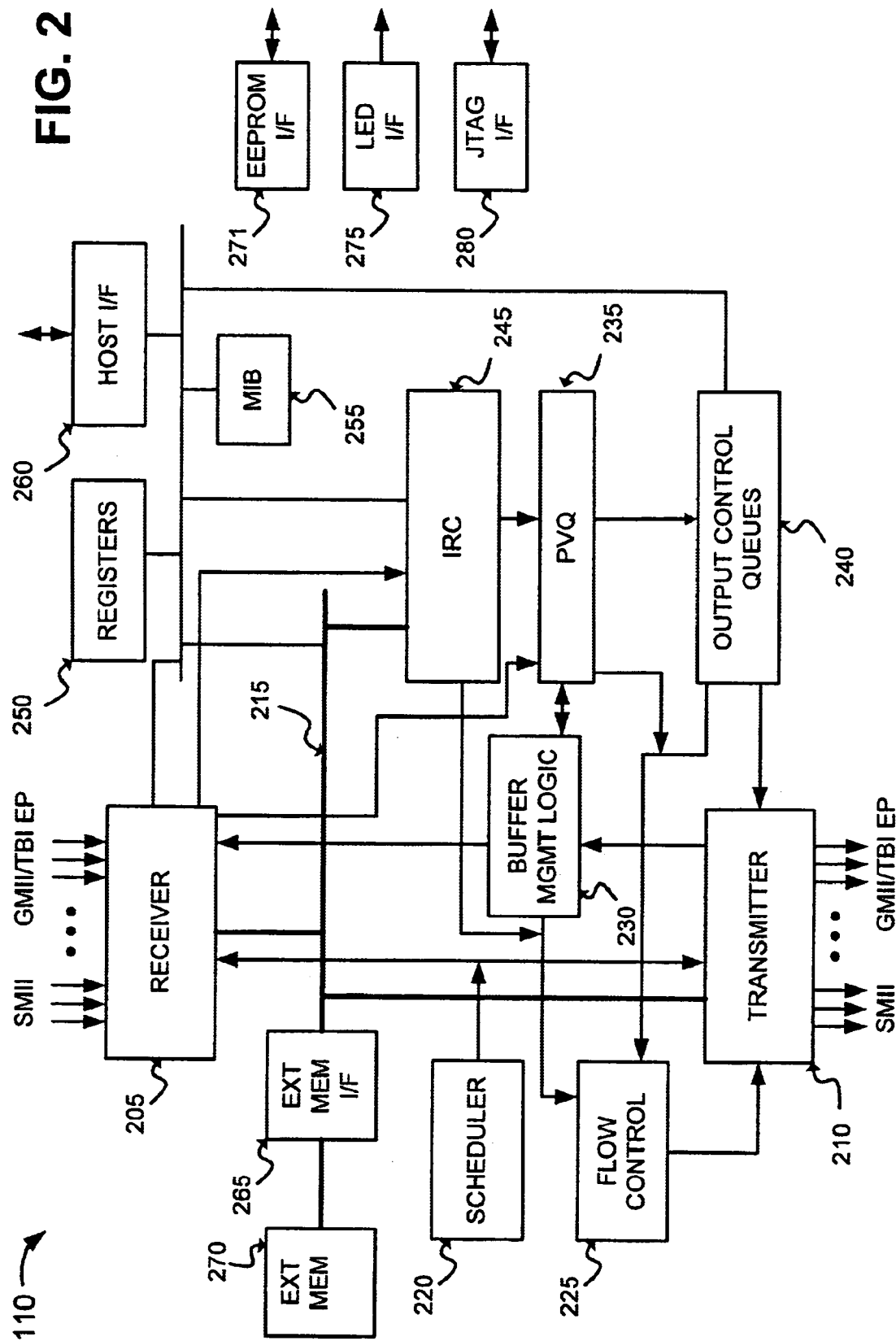
FIG. 2 is a detailed diagram of one of the multiport switches shown in FIG. 1.

FIG. 2 is a block diagram illustrating portions of switch 110 in additional detail.

Switch 110 is a multiport switch that selectively forwards data packets received from devices 105, 106, and 111 to the appropriate destination device. A number of multiport switches 110 may be cascaded together to expand the capabilities of a single multiport switch 110.

The multiport switch 110 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an external memory 270, an EEPROM interface 271, an LED interface 275, and a Joint Test Action Group (JTAG) interface 280.

The receiver 205 may include MAC modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches. The expansion ports (EPs) may be used to transfer data between other multiport switches 110 according to a prescribed protocol. The expansion ports may permit the multiport switches 110 to be cascaded together to form a backbone network. Each of the receive modules may include queuing logic that receives data packets from the network devices and stores the packets in the corresponding receive FIFOs. The queuing logic may then send portions of the packets to the IRC 245 for processing and to the external memory 270 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 110. Each of the transmit modules may include dequeuing logic that obtains packets from the external memory 270 and stores the packets in the corresponding transmit FIFOs. The transmit modules may read the data packets from the corresponding transmit FIFOs and transmit the packets to the network devices 105 and 106. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 270 by the queuing and dequeuing logic of the receiver 205 and transmitter 210, respectively. The multiport switch 110 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 270.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 110. For example, the buffer management logic 230 may manage the use of frame pointers and the reuse of frame pointers once the data packet has been transmitted to its designated output port(s). Frame pointers identify the location of data frames stored in the external memory 270 that require transmission.

The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 270 to read data frames at the memory locations specified by the frame pointers.

The IRC 245 may include an internal decision making engine that makes frame forwarding decisions for data packets that are received by the receiver 205. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a particular subnet. The IRC 245 may alternatively determine that a data frame should be transferred to another multiport switch 110 via the expansion port. Therefore, the IRC 245 determines whether a frame temporarily stored in the external memory 270 should be output to a single output port, multiple output ports, no output port, or another multiport switch 110.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 345 may examine each received data packet for up to 138 programmable patterns and process the packet based on the result. The result may dictate that the IRC 245 drop the packet, forward the packet to a host, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects. The host interface 260 may include a standard interface that permits an external management entity, such as a host computer, to control the overall operation of the multiport switch 110. The host interface 260 may decode host accesses within a prescribed register space and read and write configuration and status information to and from the registers 250.

The external memory interface 265 may include a standard interface that permits access to the external memory 270. The external memory interface 265 may permit external storage of packet data in the external memory 270 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 271 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 110.

Substituting a New Mac Destination Address

As mentioned above, IRC 245, when operating as a layer 2 switch, determines the appropriate output port(s) for a packet corresponding to an input Ethernet frame based on the frame header information. The IRC then forwards the output port information, as a forwarding descriptor, through PVQ 235 and output control queues 240. The forwarding descriptor may contain the pointer to a stored version of the frame in external memory 270, an indication of the appropriate output port(s) for the frame, and an indication of the priority for the frame.

When operating as a layer 3 switch, IRC 245 may also generate a new MAC destination address. The new MAC address may be used to overwrite the old MAC destination address of a data frame. The old MAC destination address may be overwritten while it is in external memory 270 or while the packet is being dequeued by output control queues 240 and transmitter 210. In either situation, the new MAC address is transmitted from the IRC 245 to the component that overwrites the old MAC destination address.

Figure 3:
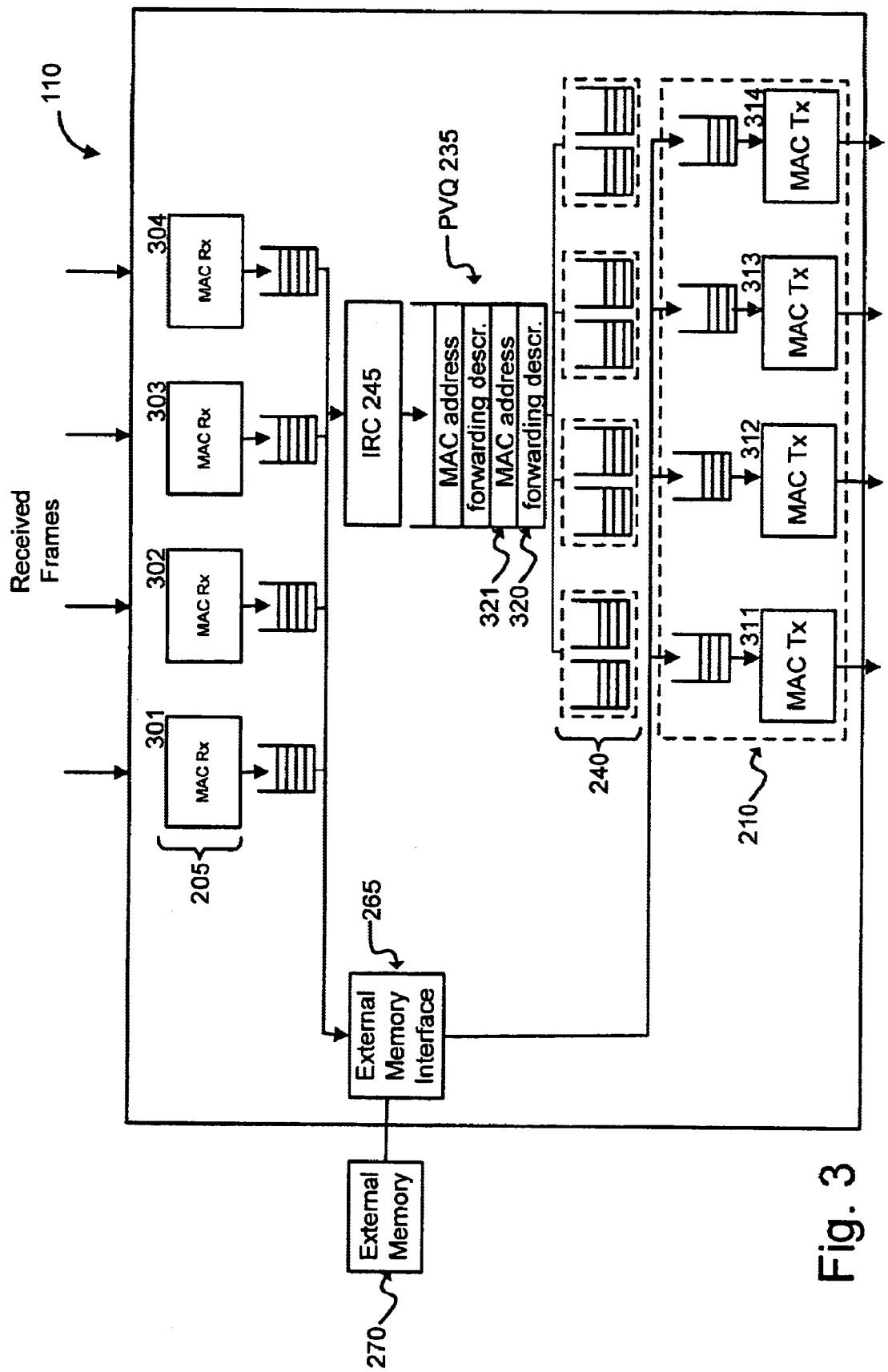
FIGS. 3–6 are diagrams illustrating the data flow path of a data frame through different implementations of the multiport switch shown in FIG. 2.

FIG. 3 is a diagram illustrating an implementation of switch 110 for overwriting the MAC destination address in a manner consistent with the present invention.

Frames are received at one of the ports, labeled as ports 301–304, in MAC receiver 205. Each frame includes a header portion and a body (frame data) portion. As discussed above, the switch 110 splits the header portion from the data portion. The data portion may then be stored, via external memory interface 265, off-chip in external memory 270. The header is forwarded to IRC 245. Based on the information in the header, IRC 245 generates, using an address lookup table, the forwarding descriptor for the frame as well as the new MAC destination address. The IRC 245 transmits this information to PVQ 235.

PVQ 235 is a FIFO queue that sends the forwarding descriptors and new MAC destination addresses to output control queues 240. For each packet, the forwarding descriptor and MAC destination address are forwarded as two sequential words of information, shown in FIG. 3 as forwarding descriptor 320 and MAC destination address 321. Each forwarding descriptor 320 and MAC destination address 321 pair remain together through output control queues 240. At the egress of output control queues 240, the packet is dequeued and reunited with its data portion. At this time, the transmitter 210 may substitute new MAC destination address 321 for the old MAC destination address.

After being reunited with its data portion, the packet is transmitted on the appropriate one of the MAC transmission ports, labeled as ports 311–314.

Transmitting the forwarding descriptor 320 and MAC-destination address 321 as a pair through PVQ 235 requires relatively little structural modifications from prior multiport switches that only transmitted the forwarding descriptor through PVQ 235 as a single word. In particular, the general structure of PVQ 235 and control queues 240 can remain largely unchanged.

Figure 4:
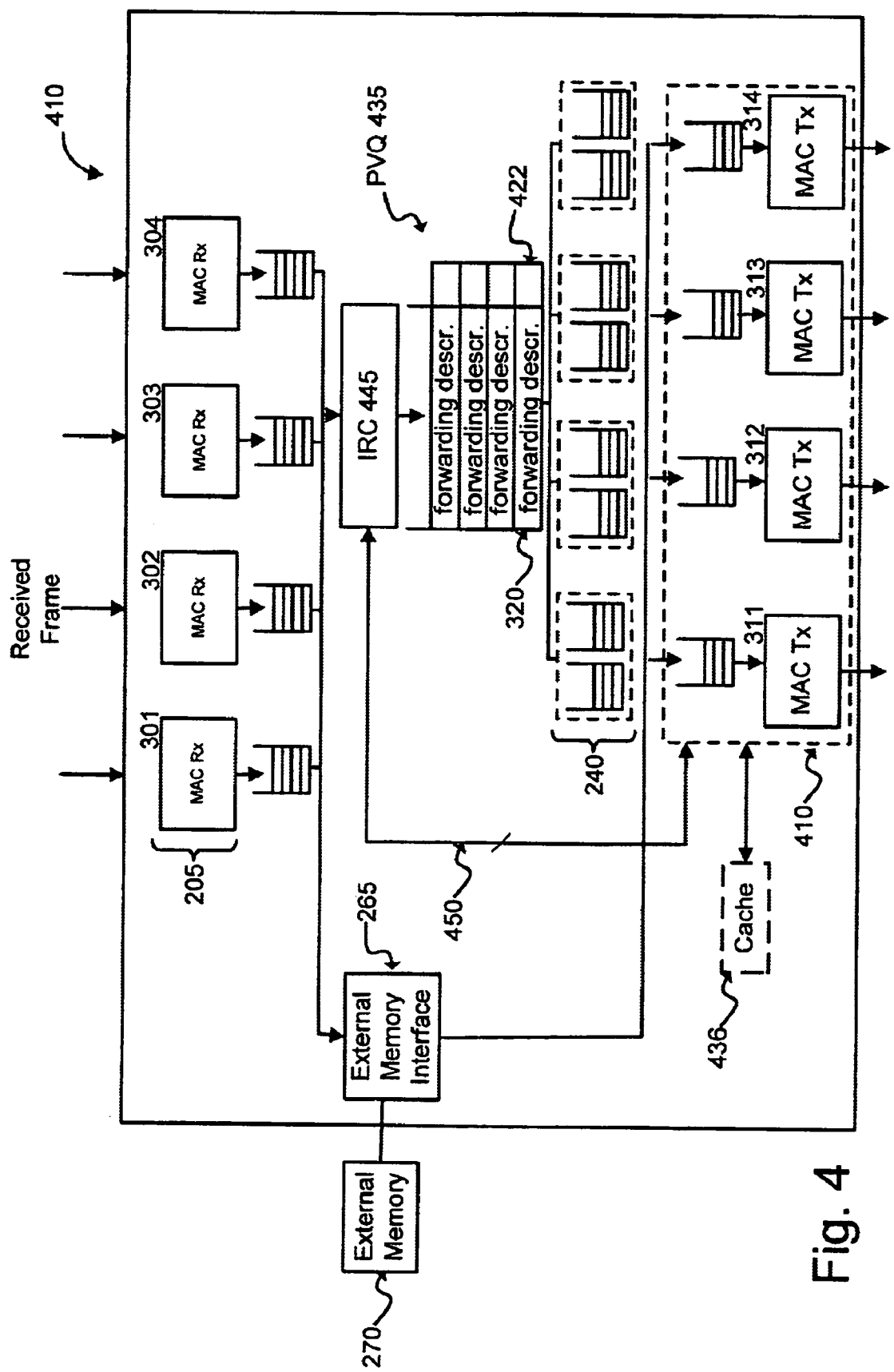

FIG. 4 is a diagram illustrating an alternate implementation of a multiport switch for overwriting the new MAC address in a manner consistent with the present invention. The switch in FIG. 4 is shown as switch 410 and is structurally similar to switch 110. Instead of transmitting the new MAC destination addresses as alternate words through the PVQ, however, IRC 445 in switch 410 transmits, for each frame, the frame's forwarding descriptor 320 and an index field 422. The index field may be a 12-bit field that IRC 445 uses to index the 48-bit MAC destination address.

IRC 445 may include an internal address lookup table that it uses to determine which output ports are appropriate for a particular destination address. Additionally, the lookup table may include the MAC destination address corresponding to a frame's IP destination address. IRC 245 fills the internal address lookup by querying network 100 when first learning entries in the address lookup table. Entries are stored and later referenced from the lookup table using an index value, which may be a 12-bit index value such as index 422. IRC 445 may generate the 12-bit index values 422 from a hash of the frame's header information.

PVQ 435 is a FIFO queue that sends the forwarding descriptors and index 422 to output control queues 240. At the egress of output control queues 240, the packet is dequeued and reunited with its data portion. At this time, the transmitter 410 may query IRC 445, via signal lines 450, for the new MAC destination address corresponding to the packet. More particularly, transmitter 410 transmits the index value 422 to IRC 445 via signal lines 450. In response, the IRC 445 looks the index value up in its address lookup table, and returns the new MAC destination address to transmitter 410 via the signal lines 450. At this time, the transmitter 410 may substitute the new MAC destination address for the old MAC destination address and transmit the packet on the appropriate output ports 311–314.

In order to conserve bandwidth on signal lines 450, switch 410 may optionally include a MAC destination address cache 436. MAC destination addresses received from IRC 445 over signal lines 450 may be stored in cache 436. Before subsequently accessing IRC 445 with an index value 422, transmitter 410 may first query the cache 436 to determine if the index value 422 and its associated MAC destination address have previously been stored in cache 436. If they have, transmitter 410 does not have to access IRC 445, and thus bandwidth used in communicating with IRC 445 can be conserved.

Figure 5:
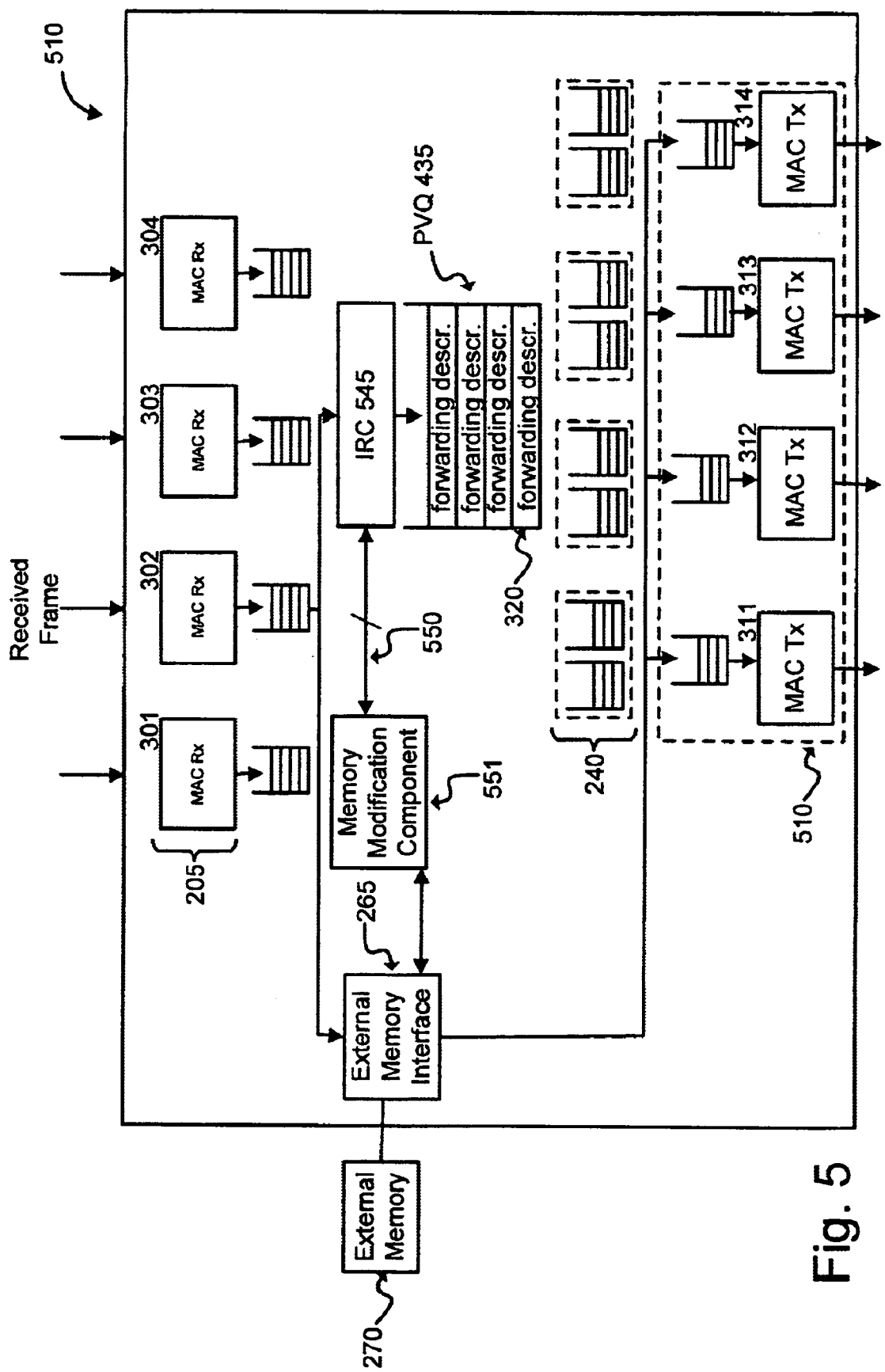

FIG. 5 is a diagram illustrating another alternate implementation of a multiport switch for overwriting the MAC destination address in a manner consistent with the present invention. The switch in FIG. 5 is shown as switch 510 and is structurally similar to switch 110. Instead of transmitting the new MAC destination addresses as alternate words through the PVQ, however, IRC 545 in switch 510 transmits, for each frame, the new MAC destination address over signal lines 550 to memory modification component 551. Memory modification component 551 then overwrites the old MAC destination address with the new MAC destination address in external memory 270. Memory modification component 551 may queue multiple requests from IRC 545 while it writes prior requests to external memory 270. Transmitter 510 may then receive the forwarding descriptors from output queues 240 and match them to the frame data portion, which now includes the new MAC destination address, before transmitting the frame on the appropriate output port(s) 311–314.

Memory modification component 551, although shown in FIG. 5, may be optional. That is, IRC 545 could directly control the overwriting of external memory 270.

Figure 6:
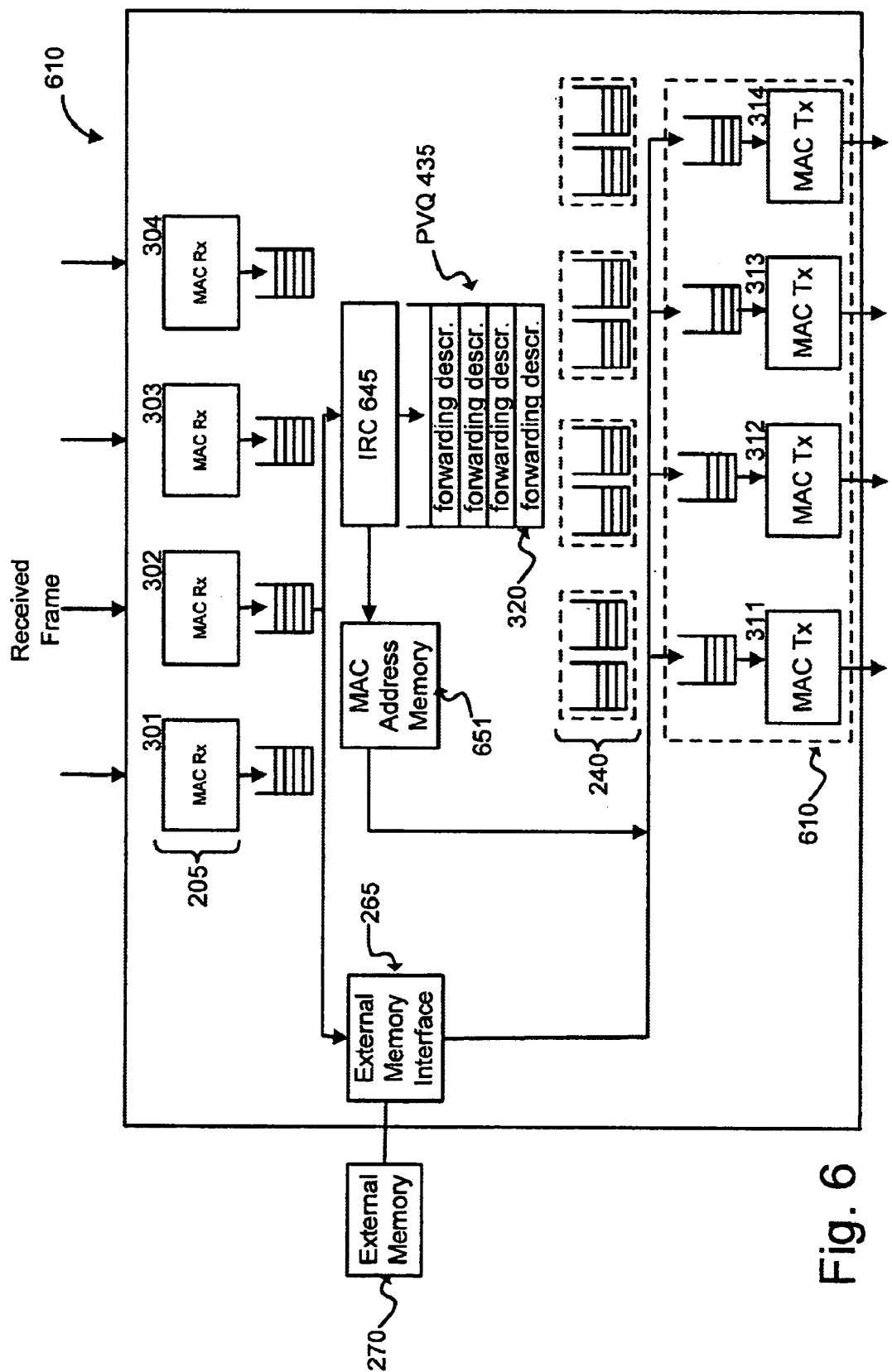

In certain situations, writing the new MAC destination addresses to external memory 270 may incur higher than desirable transmission latency. To decrease this transmission latency, portions of the external memory 270 may be implemented on the multiport switch. FIG. 6 is a diagram illustrating another alternate implementation of a multiport switch consistent with the present invention, including an on-board memory for storing the new MAC destination addresses.

Switch 610, as shown in FIG. 6, operates in a manner similar to switch 510. However, instead of writing the new MAC destination addresses to external memory 270, the IRC 645 may write the new MAC destination addresses to MAC address memory 651, implemented locally to IRC 645. MAC address memory 651 may be a high speed random access memory. Because it is implemented locally to IRC 645 and transmitter 610, the access latency of MAC address memory 651 may be less than the access latency of external memory 270.

In operation, transmitter 610 receives the forwarding descriptors from output queues 240, the new MAC destination addresses from MAC address memory 651, and the frame data portion from external memory 270. Transmitter 610 overwrites the old MAC destination address with the new MAC destination address and then transmits the packet on the appropriate output ports.

The embodiments of the present invention, as described above, substitute MAC destination addresses based on a packet's IP address using efficient techniques that require minimal modifications relative to previous generations of switches.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The scope of the invention is defined by the claims and their equivalents.

What is claimed is:

1. A multiport network device comprising:
   a receiver configured to receive data frames from a network, each of the data frames having header information that includes at least a source field indicating a source of the frame and a destination field indicating an intended destination address for the data frame;
   a transmitter configured to transmit the data frames to the network through a plurality of transmit ports;
   internal rules checking logic coupled to an output of the receiver, the internal rules checking logic receiving the header information relating to the data frames received by the receiver and, based on the header information, generating a forwarding descriptor that identifies the transmit ports and generating a new intended destination address; and
   a queue configured to store the forwarding descriptors and the new intended destination address for the data frames as pairs of sequential words, and transmit each pair of sequential words to the transmitter;
   wherein the transmitter writes the new intended destination address to the destination field before transmitting the data frame.

2. The multiport network device of claim 1, wherein the queue is a first-in-first-out (FIFO) queue.

3. The multiport network device of claim 1, further comprising:
   an external memory connected to the receiver and the transmitter, the external memory storing the data frames received by the receiver and sending the data frames to the transmitter.

4. The multiport network device of claim 1, wherein the data frames are frames in an Ethernet network and the destination field holds an Ethernet media access control (MAC) destination address.

5. The multiport network device of claim 4, wherein the new intended destination address is a MAC destination address of a device in a subnet different than a subnet of a device that originated the data frame.

6. A multiport network device comprising:
   a receiver configured to receive data frames from a network, each of the data frames having header information that includes at least a source field indicating a source of the data frame and a destination field indicating an intended destination address for the data frame;
   a transmitter configured to transmit the data frames to the network through a plurality of transmit ports;
   internal rules checking logic coupled to an output of the receiver, the internal rules checking logic receiving the header information relating to the data frames received by the receiver and, based on the header information, generating a forwarding descriptor that identifies the transmit ports and an associated new intended destination address for each of the data frames, the internal rules checking logic additionally generating an index value corresponding to the new intended destination address; and
   a queue configured to receive the forwarding descriptors and the index values corresponding to the new intended destination addresses of the data frames and to transmit each of the forwarding descriptors and the index values to the transmitter, the index value being used by the transmitter to obtain the new intended destination address for the data frames by querying the internal rules checking logic with the index value.

7. The network device of claim 6, wherein each of the associated forwarding descriptors and index values are stored as a single entry within the queue.

8. The network device of claim 6, further comprising:
a cache memory coupled to the transmitter, the cache memory storing new intended destination addresses and the associated index values, and the transmitter foregoing querying the internal rules checking logic with the index value when the index value and the associated new intended destination address are present in the cache memory.

9. The multiport network device of claim 6, wherein the queue is a first-in-first-out (FIFO) queue.

10. The multiport network device of claim 6, wherein the transmitter writes the new intended destination address to the destination field before transmitting the data frame.

11. The multiport network device of claim 6, further comprising:
an external memory connected to the receiver and the transmitter, the external memory storing the data frames received by the receiver and transmitting the data frames to the transmitter.

12. The multiport network device of claim 6, wherein the data frames are data frames in an Ethernet network and the destination field holds an Ethernet media access control (MAC) destination address.

13. A multiport network device comprising:
a receiver configured to receive data frames from a network, each of the data frames having header information that includes at least a source field indicating a source of the data frame and a destination field indicating an intended destination for the data frame;
a transmitter configured to transmit the data frames to the network through a plurality of transmit ports;
a memory coupled to the transmitter and the receiver, the memory storing the data frames received by the receiver and sending the data frames to the transmitter;
internal rules checking logic coupled to an output of the receiver, the internal rules checking logic receiving the header information relating to the data frames received by the receiver and, based on the header information, generating a forwarding descriptor that identifies the transmit ports and a new destination address for the data frames, the internal rules checking logic overwriting the destination address of the data frames stored in the memory with the generated new destination address; and
a queue configured to receive the forwarding descriptors and to transmit each of the forwarding descriptors to the transmitter, the transmitter retrieving the data frames from memory based on the forwarding descriptors.

14. The multiport network device of claim 13, wherein the memory is a memory device external to the network device.

15. The multiport network device of claim 13, wherein the data frames are frames in an Ethernet network and the destination field holds an Ethernet media access control (MAC) destination address.

16. The multiport network device of claim 15, wherein the new intended destination address is a MAC destination address of a device in a subnet different than a subnet of a device that originated the data frame.

17. A method of processing data frames in a network device comprising:
receiving a data frame at one of a plurality of receive ports in the network device, the data frame having a header that includes at least a source field indicating a source of the data frame and a destination field indicating an intended destination for the data frame;
determining a forwarding descriptor for the data frame based on the header information, the forwarding descriptor identifying transmit ports to output the data frame and a new destination address for the data frame;
storing the forwarding descriptor and the new destination address as a pair of sequential words in a memory;
forwarding the stored pair of sequential words to the transmit ports of the network device;
transmitting the data frame from the transmit ports identified by the forwarding descriptor; and
writing the new destination address in the destination field of the data frame before transmitting the data frame.

* * * * *